United States Patent
Bizard

[19]

[11] Patent Number: 6,155,159
[45] Date of Patent: Dec. 5, 2000

[54] SAFETY DEVICE FOR ELECTRIC COOKING APPLIANCE HAVING A REMOVABLE BOWL

[75] Inventor: Jean-Claude Bizard, Fontaine les Dijon, France

[73] Assignee: SEB S.A., Ecully, France

[21] Appl. No.: 09/510,221

[22] Filed: Feb. 22, 2000

[30] Foreign Application Priority Data

Feb. 19, 1999 [FR] France .................................. 99 02261

[51] Int. Cl.[7] .................................................. A47J 37/12
[52] U.S. Cl. .............................. 99/330; 99/331; 99/337; 99/403; 219/438; 219/441; 219/494; 219/497
[58] Field of Search ............................ 99/330–333, 337, 99/338, 403–407, 410–418, 336; 126/391, 21 A, 374; 219/494, 497, 449, 436, 438, 441; 392/405, 477; 426/438

[56] References Cited

U.S. PATENT DOCUMENTS

| | | | |
|---|---|---|---|
| 4,103,604 | 8/1978 | Berard | 99/403 X |
| 4,503,320 | 3/1985 | Polster | 219/441 |
| 4,574,183 | 3/1986 | Knauss | 219/438 |
| 4,691,096 | 9/1987 | Knauss | 219/441 |
| 4,751,915 | 6/1988 | Price | 126/391 |
| 4,785,725 | 11/1988 | Tate et al. | 99/330 |
| 4,998,007 | 3/1991 | Knauss | 99/403 X |
| 5,575,194 | 11/1996 | Maher, Jr. et al. | 99/330 |
| 5,839,360 | 11/1998 | Williams | 210/167 X |

FOREIGN PATENT DOCUMENTS

| | | |
|---|---|---|
| 2 724 835 | 3/1996 | France . |
| 98 01064 | 1/1998 | WIPO . |

*Primary Examiner*—Timothy Simone
*Attorney, Agent, or Firm*—Pillsbury Madison & Sutro

[57] ABSTRACT

A safety device for an electric cooking appliance, the appliance having a case forming a housing provided to receive a removable bowl and a unit for heating the bowl. The safety device is composed of an element for sensing the presence of the bowl in the housing, the element being mounted to be movable against a restoring member between a first position which the element assumes when the bowl is present in the housing, and a second position which the element assumes when the bowl is not present in the housing or is not correctly positioned in the housing, the second position corresponding to a position to which the element is urged by the restoring member. The sensing element includes a detection zone which cooperates with the bowl and an actuation zone which cooperates with a switch arranged to close a circuit for supplying current to the unit for heating the bowl when the sensing element occupies the first position and to disconnect the circuit from the unit for heating the bowl when the sensing element occupies the second position and the sensing element includes a deformable part which is capable of being deformed when a bowl that is correctly positioned in the housing attains an abnormally high temperature to cause the sensing element to assume, under the urging of the restoring member, the second position in which the switch disconnects the circuit from the unit for heating the bowl.

24 Claims, 1 Drawing Sheet

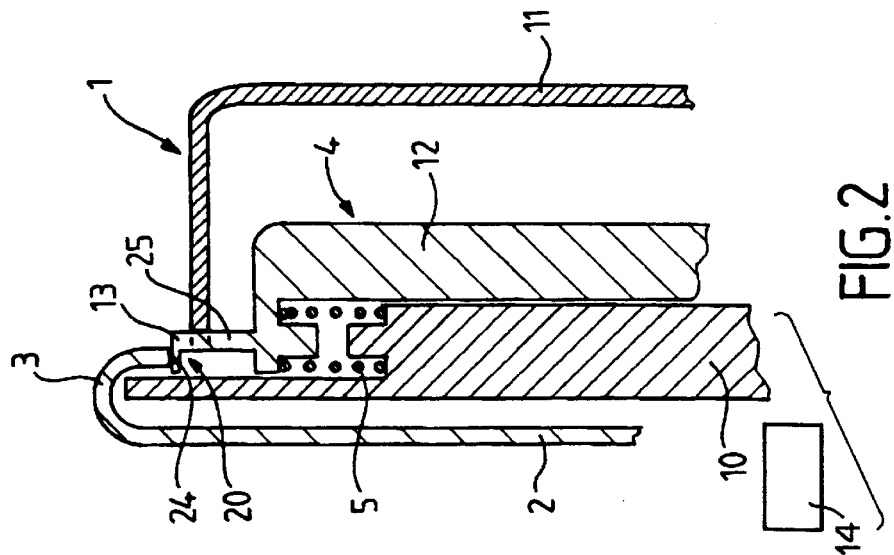
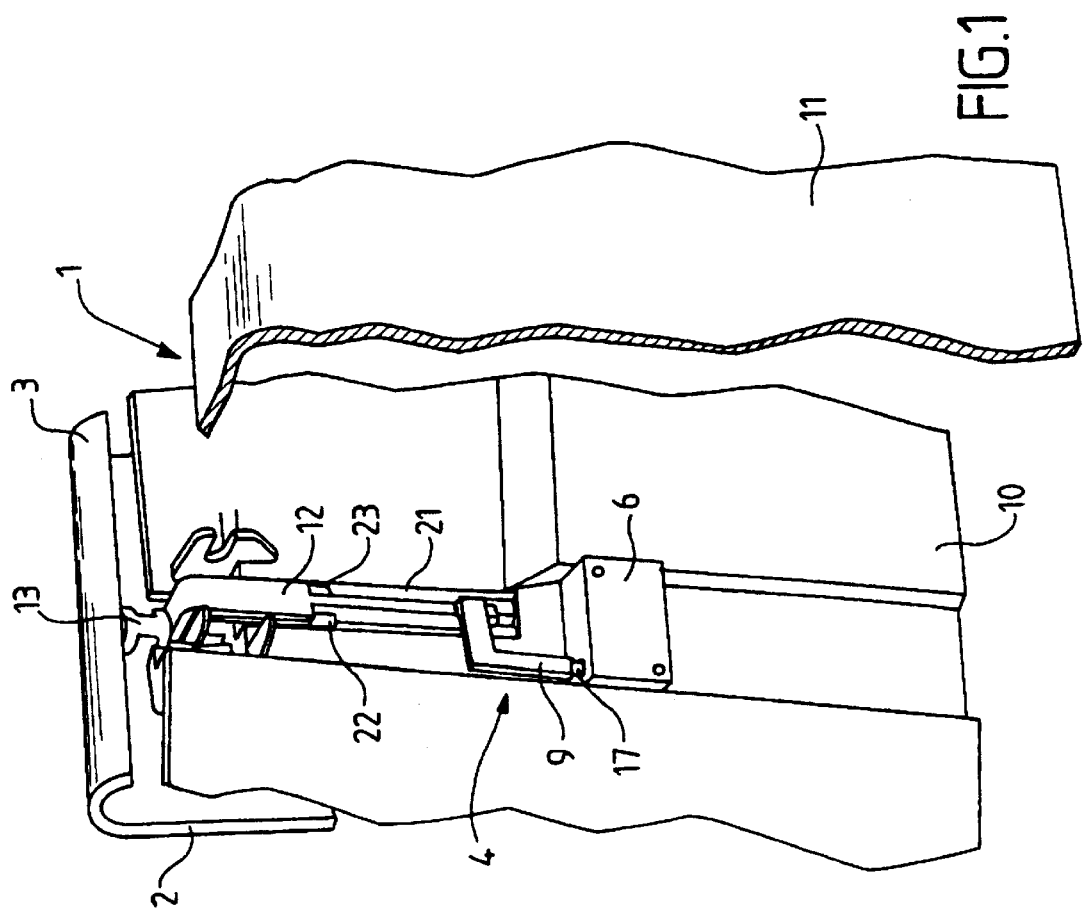

SAFETY DEVICE FOR ELECTRIC COOKING APPLIANCE HAVING A REMOVABLE BOWL

BACKGROUND OF THE INVENTION

The present invention relates to the general technical field of electric cooking appliances having a removable bowl, and concerns particularly electric fryers. The invention relates more particularly to safety devices for such appliances.

In fryers having a removable bowl, the temperature regulation and thermal protection means cannot be fixed to, or in permanent contact with, the bowl. It is therefore known to mount these means in a flexible manner to allow for the removability of the bowl and to assure a good thermal contact with the bowl when it is installed in the appliance. These limitations on the temperature regulation and thermal protection means give rise to significantly greater thermal inertia and temperature drift than in a fryer having a fixed bowl. These limitations also impair performance consistency, or repeatability, from one appliance to another and poorer operating reliability for those means.

In the case of breakdown of the thermostat of the appliance, the thermal protection is provided by a final, or backup, thermal safety element formed, for example, by a thermal fuse or by a resettable safety limiter. This final safety element can also come into play if the appliance should be heated while the bowl is dry or while the bowl contains an insufficient quantity of cooking fat.

When the final safety element comes into play, either as a result of a breakdown in the appliance, or because of negligence on the part of the user, the user is then obliged to have the appliance repaired. When a meltable fuse is provided, it is necessary to replace the fuse at the same time that possible replacement may be needed for the elements that have broken down. Since a final safety element is involved, it is necessary to check out the repair work very carefully after installation of the new fuse. In the case of a resettable safety limiter, it is only necessary to simply reset the limiter at the time of replacement of any elements that have broken down. This simplifies the repair, particularly when it is necessitated by the user's negligence. However, fabrication of the appliance with a resettable thermal limiter is more expensive than with a meltable fuse.

Electric fryers having a removable bowl generally include an outer case whose interior defines a housing for receiving the bowl. It is known to provide such fryers with a device for detecting the presence of the bowl in the housing. Such a device includes an element for sensing the presence of the bowl, the element cooperating with a switch connected to open the circuit which supplies heating current to the heating means of the fryer if the bowl is not present in the housing or if the bowl is not correctly positioned in the housing. However, if the bowl is correctly positioned in the housing, such a device will not prevent the supply of heating current to the heating means if the bowl is empty or if the bowl does not contain a sufficient quantity of cooking fat.

French Patent Document FR2 724 835 describe an electric fryer having a case forming a housing provided to receive a removable bowl, means for heating the bowl and a safety device including an element for sensing the presence of the bowl. The sensing element is mounted to be movable against a restoring, or bias, means between a first position when the bowl is correctly positioned in the housing and a second position when the bowl is not present, or is incorrectly positioned, in the housing. This second position is a position into which the sensing element is urged by the restoring means. The sensing element of the safety device defines a detection zone and an actuation zone. The detection zone is provided to cooperate with the bowl and the actuation zone is provided to cooperate with a switch arranged to close the current supply circuit for the heating means when the sensing element occupies the first position. The switch disconnects the current supply circuit from the heating means when the sensing element occupies the second position. The sensing element can also provide thermal safety by cooperating, by thermal conduction with a safety thermostat. However, the safety thermostat is an additional component.

BRIEF SUMMARY OF THE INVENTION

An object of the present invention is to provide an additional safety device which is capable of acting before the final safety element in case of heating a bowl which is empty or which contains an insufficient quantity of cooking fat, even if the bowl is correctly disposed in the housing.

Another object of the invention is to provide such an additional safety device which adds very little to the cost of manufacturing the appliance.

The above and other objects are achieved, according to the present invention, with a safety device for an electric cooking appliance which has a case forming a housing provided to receive a removable bowl and means for heating the bowl. The safety device includes an element for sensing the presence of the bowl, the element being mounted to be movable against a restoring means between a first position which it assumes when the bowl is present in the housing, and a second position which it assumes when the bowl is not present in the housing or is not correctly positioned in the housing, corresponding to the position to which the element is urged by the restoring means. The sensing element provides a detection zone which cooperates with the bowl and an actuation zone which cooperates with a switch arranged to close the current supply circuit for the heating means when the sensing element occupies the first position. The switch opens the current supply circuit for the heating means when the sensing element occupies the second position. The sensing element includes a part which is capable of being deformed when a bowl that is correctly positioned in the housing attains an abnormally high temperature. In that case, the sensing element assumes, under the action of the restoring means, its second position in which the switch disconnects the current supply circuit from the heating means. Thus, it is possible, with a minor modification of an existing device, to provide a safety element whose replacement is less costly than that of a final safety element. In addition, if the appliance is equipped with a final safety element, the device according to the invention constitutes an additional safety device.

Advantageously, the part which is capable of being deformed forms the detection zone in contact with the bowl when the bowl is correctly positioned in the housing, this arrangement facilitating sensing of an abnormally high temperature. Advantageously, the part capable of being deformed is made of a plastic material, which permits sensing of an abnormally high temperature to be facilitated due to the change in mechanical strength of the material.

Advantageously, to simplify construction of the appliance and reduce fabrication costs, the sensing element is formed of one piece having a portion which constitutes the detection zone provided to cooperate with the bowl and a portion which constitutes the actuation zone provided to cooperate with the switch.

Advantageously, the detection zone is formed by a wall having a small thickness provided by the sensing element and on which an edge of the bowl rests when the bowl is correctly positioned in the housing. In comparison with a device for detecting the presence of a bowl which does not perform the safety function that is the object of the present invention, it is sufficient, to achieve the objects of the invention, to modify the upper part of the device which is actuated by introduction of the bowl into the housing.

Advantageously, the sensing element is mounted to slide in a wall of the case, such an arrangement permitting creation of a device which is reliable and inexpensive.

Advantageously, the sensing element is mounted behind a removable exterior wall portion of the case. As a result, if that element must be replaced, it will be sufficient to remove the wall portion in order to gain access to the sensing element.

Also advantageously, the sensing element cooperates with an edge of the bowl, which facilitates installation of the sensing element in the case.

It is also advantageous that the deformation of the portion of the sensing element which is capable of being deformed when the bowl is correctly positioned in the housing and is subjected to an abnormally high temperature, is irreversible. This feature prevents use of the appliance after deformation of the sensing element.

This invention finds particular utility in an electric cooking appliance, particularly a fryer, having a case made of plastic material forming the housing which receives a removable bowl made of aluminum. In effect, such fryers are subjected to high temperatures and the temperature regulation means cannot always withstand the temperatures attained if heating occurs when the bowl is dry or when the bowl contains an insufficient quantity of cooking fat.

Embodiments of the invention will be described below with reference to the drawings which illustrate one preferred embodiment of the invention, being understood that the invention is not limited to this embodiment.

BRIEF DESCRIPTION OF THE SEVERAL VIEWS OF THE DRAWING

FIG. 1 is an exploded, perspective detail view of a portion of a cooking appliance, such as an electric fryer, provided with a preferred embodiment of a device according to the invention.

FIG. 2 is a cross-sectional view of the upper part of the device shown in FIG. 1.

DETAILED DESCRIPTION OF THE INVENTION

FIG. 1 shows the preferred embodiment of a safety device according to the invention in an electric cooking appliance, such as an electric fryer. The appliance includes a case 1 having an inner wall 10 and an outer wall 11. Inner wall 10 delimits a housing arranged to receive a removable bowl 2. Only an upper portion of the side wall and a folded lip 3 of bowl 2 are illustrated. It will be understood that bowl 2 continues downwardly from the wall portion shown and that the lateral wall and lip 3 are normally circular.

Walls 10 and 11 are spaced apart to provide a space in which can be housed various elements such as a thermostat and/or a meltable fuse. Wall 11 is, or has a portion which is, removable to permit access to various devices, such as temperature regulation means or a thermal safety means (not shown) for the appliance.

The safety device according to the present invention includes a sensing element 4 which is movable in response to the presence of bowl 2 in the housing. Sensing element 4 is formed in one piece of a plastic material, which is preferably polyethylene or polypropylene.

Element 4 is installed in case 1 between walls 10 and 11 and includes a shaft, or rod, 12 which slides in a groove 21 provided in wall 10. There are also provided two travel guides 22, 23 between which shaft 12 slides and which help to maintain shaft 12 in a given travel path.

Shaft 12 carries a lug 13 provided to be engaged with folded-over lip, or edge, 3 of bowl 2. Shaft 12 further carries a foot 9 that is fixed to shaft 12 and that is arranged to engage with an actuator, or actuating button, 17 of an electrical switch 6. Lug 13 thus provides a zone for sensing the presence of bowl 2 and foot 9 provides a zone for actuating switch 6.

FIG. 2 shows sensing element 4 arranged to be movable against the restoring action of a restoring, or bias, spring 5.

As shown in FIG. 2, when bowl 2 is present, and properly positioned, in the housing defined by case 1, sensing element 4 is caused to descend into a first position in which switch 6 is actuated to close the current supply circuit for heating means 14 of the appliance, actuator 17 then being depressed.

If bowl 2 is not present or if it is not properly positioned in case 1, sensing element 4 occupies a second, elevated, position, corresponding to the position produced when spring 5 alone acts on sensing element 4. In this second position actuator 17 is raised and switch 6 is in a condition to open the circuit which supplies current to the heating means.

According to the invention, sensing element 4 includes a part 20 which is capable of deforming when it is in contact with bowl 2, i.e., when bowl 2 is properly seated in case 1 and bowl 2 has been heated to an abnormally high temperature. Such deformation of part 20 will allow sensing element 4 to move to the second position in which switch 6 creates an open circuit for the current supply of the appliance.

An abnormally high temperature of bowl 2 when it is correctly installed in case 1 is a temperature attained by bowl 2 which is higher than temperatures that occur under normal operating conditions of the appliance. An abnormally high temperature can occur when current is being supplied to the heating means and bowl 2 does not contain any cooking oil or fat, or bowl 2 contains an insufficient quantity of cooking oil or fat, or several solid blocks of cooking fat have been placed in bowl 2 and have not melted quickly enough to allow bowl 2 to remain at an acceptable temperature, or there has been a breakdown of the temperature control means for the appliance. The temperatures obtained at the upper part of bowl 2 will be, for example, of the order of 135° C. under normal operating conditions, and of the order of 190° if heat is applied while bowl 2 is empty. Temperatures of higher than 190° may be reached if there should be a breakdown in the temperature control means.

As shown in FIG. 2, lug 13 is constituted by a vertical part 25 which extends from shaft 12 and a wall 24 which extends from vertical part 25. Wall 24 is relatively thin and essentially constitutes deformable part 20. Wall 24 provides the surface on which edge 3 of bowl 2 rests when bowl 2 is properly positioned in case 1. It will be noted that return spring 5 is interposed on shaft 12 at a location between wall 24 and foot 9.

The device shown in FIGS. 1 and 2 operates in the following manner.

When bowl 2 is correctly disposed in case 1, edge 3 of bowl 2 rests on wall 24.

If the user should be negligent, for example by turning the appliance on without providing cooking fat in bowl 2 or even providing an insufficient quantity thereof, bowl 2 becomes heated rapidly to a temperature above the normal operating temperature, resulting in an overheating of bowl 2 and of the upper part of case 1 on which bowl 2 rests. If the temperature control means should experience a breakdown, the temperature at the upper part of bowl 2 can reach values above 220° C.

Such a situation is all or more dangerous when case 1 is made of a plastic material, and in particular when it is made of a plastic material having a poor thermal resistance, such as polypropylene, and when plastic is used for a part of case 1 that is in proximity to the upper part of bowl 2. Overheating of a part of case 1 can lead to permanent deformation of the case and this is likely to compromise proper functioning of the appliance if, for example, the water tightness between a lid (not shown in the drawings) and case 1 is adversely effected by such deformation.

When bowl 2 is made of aluminum, whether coated or not, the transmission of heat occurs rapidly in the absence of a sufficient quantity of cooking fat to absorb the heat emitted by the heating means.

When the temperature of edge 3 of bowl 2 rises, the temperature of wall 24 also rises to reach a value such that the upward force exerted by return spring 5 contributes to deformation of wall 24. Wall 24 thus forms part 20 which is capable of deforming when bowl 2 is correctly positioned in case 1 and is heated to an abnormally high temperature. Thermal deformation of wall 24 when it is subjected to a high temperature and a deformation force is irreversible and wall 24 sags. As a result, under the action of return spring 5, shaft 12 will slide upwardly between guides 21 and 22, causing foot 9 to also move upwardly and release actuator 17 of switch 6. As a result, switch 6 is operated to open the circuit which supplies current to heating means 14.

Then, the appliance can no longer operate until sensing element 4 has been replaced. However, such replacement can be effectuated easily by removing wall 11 or a portion thereof which faces sensing element 4.

According to one variation within the framework of the invention, return spring 5 can be eliminated if the return means associated with actuator 17 of switch 6 produces a sufficient force to assure upward movement of sensing element 4 when bowl 2 is withdrawn from case 1 or in order to deform wall 24 when bowl 2 is correctly positioned in case 1 but has reached an abnormally high temperature.

According to another variation within the framework of the invention, the sensing element can include or be formed by a deformable metal piece, for example a bimetallic strip, or even a suitably shaped memory alloy piece. Then, deformation of the piece may be either reversible or irreversible.

Switch 6 can be any type of means for opening and closing a current supply circuit, and can even be optical or magnetic means.

This application relates to subject matter disclosed in French Application number 99092261, filed on Feb. 19, 1999, the disclosure of which is incorporated herein by reference.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A safety device for an electric cooking appliance, the appliance having a case forming a housing provided to receive a removable bowl and means for heating the bowl, said safety device comprising:

an element for sensing the presence of the bowl in the housing, said element being mounted to be movable against a restoring means between a first position which said element assumes when the bowl is present in the housing, and a second position which said element assumes when the bowl is not present in the housing or is not correctly positioned in the housing, the second position corresponding to a position to which said element is urged by the restoring means, wherein said sensing element includes a detection zone which cooperates with the bowl and an actuation zone which cooperates with a switch arranged to close a circuit for supplying current to the means for heating the bowl when the sensing element occupies the first position and to disconnect the circuit from the means for heating the bowl when the sensing element occupies the second position and said sensing element includes a deformable part which is capable of being deformed when a bowl that is correctly positioned in the housing attains an abnormally high temperature to cause said sensing element to assume, under the urging of the restoring means, the second position in which the switch disconnects the circuit from the means for heating the bowl.

2. The device according to claim 1, wherein said deformable part forms the detection zone and is in contact with the bowl when the bowl is correctly positioned in the housing.

3. The device according to claim 2, wherein said deformable part is made of a plastic material.

4. The device according to claim 3, wherein said sensing element is formed in one piece.

5. The device according to claim 4, wherein said deformable part is constituted by a thin wall on which rests an upper edge of the bowl when the bowl is correctly positioned in the housing.

6. The device according to claim 5, wherein said sensing element is slidably mounted in a wall of the case.

7. The device according to claim 6, wherein said sensing element is mounted behind a removable lateral exterior wall of the case.

8. The device according to claim 7, wherein said sensing element cooperates with a lip at the top of the bowl.

9. The device according to claim 8, wherein the deformation of said deformable part when the bowl is subjected to an abnormally high temperature is irreversible.

10. A cooking appliance comprising a case forming a housing provided to receive a removable bowl, means for heating the bowl and the safety device according to claim 7, wherein said bowl is made of aluminum.

11. Cooking appliance according to claim 10, wherein said appliance is a fryer.

12. A cooking appliance comprising a case forming a housing provided to receive a removable bowl, means for heating the bowl and the safety device according to claim 7, wherein the case is made of a plastic material.

13. Cooking appliance according to claim 12, wherein said appliance is a fryer.

14. The device according to claim 1, wherein said deformable part is made of a plastic material.

15. The device according to claim 1, wherein said sensing element is formed in one piece.

16. The device according to claim 1, wherein said deformable part is constituted by a thin wall on which rests an upper edge of the bowl when the bowl is correctly positioned in the housing.

17. The device according to claim 1, wherein said sensing element is slidably mounted in a wall of the case.

18. The device according to claim 1, wherein said sensing element is mounted behind a removable lateral exterior wall of the case.

19. The device according to claim 1, wherein said sensing element cooperates with a lip at the top of the bowl.

20. The device according to claim 1, wherein the deformation of said deformable part when the bowl is subjected to an abnormally high temperature is irreversible.

21. A cooking appliance comprising a case forming a housing provided to receive a removable bowl, means for heating the bowl and the safety device according to claim 1, wherein said bowl is made of aluminum.

22. Cooking appliance according to claim 21, wherein said appliance is a fryer.

23. A cooking appliance comprising a case forming a housing provided to receive a removable bowl, means for heating the bowl and the safety device according to claim 1, wherein the case is made of a plastic material.

24. Cooking appliance according to claim 23, wherein said appliance is a fryer.

\* \* \* \* \*